United States Patent
Liu et al.

(10) Patent No.: US 12,057,965 B2
(45) Date of Patent: Aug. 6, 2024

(54) DATA COMMUNICATION METHOD AND APPARATUS, ELECTRONIC DEVICE, AND STORAGE MEDIUM

(71) Applicant: Launch Tech Co., Ltd., Guangdong (CN)

(72) Inventors: Jun Liu, Guangdong (CN); Zhijian Chen, Guangdong (CN)

(73) Assignee: Launch Tech Co., Ltd., Guangdong (CN)

( * ) Notice: Subject to any disclaimer, the term of this patent is extended or adjusted under 35 U.S.C. 154(b) by 43 days.

(21) Appl. No.: 17/746,163

(22) Filed: May 17, 2022

(65) Prior Publication Data

US 2023/0208676 A1 Jun. 29, 2023

Related U.S. Application Data

(63) Continuation of application No. PCT/CN2022/073726, filed on Jan. 25, 2022.

(30) Foreign Application Priority Data

Dec. 24, 2021 (CN) .......................... 202111603825.9

(51) Int. Cl.
*H04L 12/40* (2006.01)
*H04L 47/28* (2022.01)

(52) U.S. Cl.
CPC .......... *H04L 12/4013* (2013.01); *H04L 47/28* (2013.01); *H04L 2012/40215* (2013.01)

(58) Field of Classification Search
CPC ... H04L 12/4013; H04L 12/403; H04L 12/66; H04L 47/28; H04L 47/13; H04L 67/12; H04L 43/0882

See application file for complete search history.

(56) References Cited

U.S. PATENT DOCUMENTS 10,033,546 B2 * 7/2018 Lee ...................... G06F 11/0739
2005/0209765 A1 * 9/2005 Erhart ................... G01S 13/931
701/96

(Continued)

FOREIGN PATENT DOCUMENTS

CN 106452667 A 2/2017
CN 106549844 A 3/2017

(Continued)

OTHER PUBLICATIONS

CNIPA, International Search Report and Written Opinion for International Patent Application No. PCT/CN2022/073726, Jul. 27, 2022, 11 pages.

(Continued)

*Primary Examiner* — Rasheed Gidado
(74) *Attorney, Agent, or Firm* — IP Spring

(57) ABSTRACT

The disclosure provides a data communication method and apparatus, an electronic device, and a storage medium. The method includes: receiving controller area network (CAN) bus data transmitted by a first device; executing a first flow-control based transmission between the first connector and the first device to obtain respective consecutive frame data in multi-packet data from the first device, upon detecting that the CAN bus data is first frame data in the multi-packet data; and transmitting the first frame data and the respective consecutive frame data to a second connector to indicate that the second connector transmits the multi-packet data to a second device through a second flow-control based transmission, when or after executing the first flow-control based transmission between the first connector and the first device.

18 Claims, 5 Drawing Sheets

(56) References Cited

U.S. PATENT DOCUMENTS

| | | | |
|---|---|---|---|
| 2014/0188253 A1 | 7/2014 | Lee et al. | |
| 2017/0171051 A1* | 6/2017 | Joo | H04L 47/24 |
| 2019/0079842 A1 | 3/2019 | Chae et al. | |
| 2020/0244478 A1* | 7/2020 | Dieckmann | B60D 1/36 |
| 2021/0065474 A1* | 3/2021 | Liu | G07C 5/0808 |
| 2021/0266193 A1* | 8/2021 | Bijala | H04L 12/4013 |
| 2021/0359950 A1 | 11/2021 | Huang et al. | |

FOREIGN PATENT DOCUMENTS

| | | |
|---|---|---|
| CN | 106878124 A | 6/2017 |
| CN | 109672597 A | 4/2019 |
| CN | 111030905 A | 4/2020 |
| CN | 113452591 A | 9/2021 |
| CN | 214704353 U | 11/2021 |
| WO | 2021042241 A1 | 3/2021 |

OTHER PUBLICATIONS

EPO, Extended European Search Report for European Patent Application No. 22722677.6, Jul. 7, 2023, 10 pages.
CNIPA, First Office Action for Chinese Patent Application No. CN202111603825.9, mailed Jul. 25, 2022, 22 pages.

* cited by examiner

DATA COMMUNICATION METHOD AND APPARATUS, ELECTRONIC DEVICE, AND STORAGE MEDIUM

CROSS-REFERENCE TO RELATED APPLICATION(S)

This application is a continuation under 35 U.S.C. § 120 of International Patent Application No. PCT/CN2022/073726, filed on Jan. 25, 2022, which claims priority under 35 U.S.C. § 119(a) and/or PCT Article 8 to Chinese Patent Application No. 202111603825.9, filed on Dec. 24, 2021, the entire disclosures of which are hereby incorporated by reference.

TECHNICAL FIELD

The disclosure belongs to the technical field of communication, and in particular relates to a data communication method and apparatus, an electronic device, and a storage medium.

BACKGROUND

A controller area network (CAN) is a serial communication protocol internationally standardized by International organization for standardization (ISO), and a CAN bus has become a standard bus of an automobile computer control system and an embedded industrial controller area network.

Generally, two devices directly connected with the CAN bus in a short range can be directly in CAN communication with each other. However, in some application scenarios, remote transmission of CAN bus data between two devices that are relatively far away from each other is required. In these application scenarios, the two devices can be connected with a connector with a network communication function, and the remote transmission of the CAN bus data between the two devices can be realized indirectly through the connector. However, there exists a problem of CAN bus data transmission failure due to influence of a network speed in existing remote transmissions realized by means of the connector.

SUMMARY

In a first aspect of the present disclosure, a data communication method is provided, which is applicable to a first connector and includes the following.

Controller area network (CAN) bus data transmitted by a first device is received, where a CAN communication connection has been established between the first connector and the first device. A first flow-control based transmission between the first connector and the first device is executed upon detecting that the CAN bus data is first frame data in the multi-packet data, to obtain respective consecutive frame data in multi-packet data from the first device. The first frame data and the respective consecutive frame data are transmitted to a second connector when or after the first flow-control based transmission between the first connector and the first device is executed, to indicate that the second connector transmits the multi-packet data to a second device through a second flow-control based transmission. A network communication connection has been established between the first connector and the second connector and a CAN communication connection has been established between the second connector and the second device.

In a second aspect of the present disclosure, another data communication method is provided, which is applicable to a second connector and includes the following.

First frame data of multi-packet data transmitted by a first connector is received. A network communication connection has been established between the second connector and the first connector and a CAN communication connection has been established between the second connector and a second device. Respective consecutive frame data of the multi-packet data transmitted by the first connector is received. The first frame data is transmitted to the second device and a second flow-control based transmission is executed to transmit the respective consecutive frame data to the second device.

In a third aspect of the present disclosure, an electronic device is provided, which includes a memory, a processor and a computer program stored in the memory and executable on the processor, and the computer program, when executed by the processor, causes the electronic device to implement steps of the data communication method as described in the first or second aspect.

BRIEF DESCRIPTION OF THE DRAWINGS

In order to explain technical solutions in embodiments of this disclosure more clearly, drawings used in description of the embodiments or the prior art will be briefly introduced below.

DETAILED DESCRIPTION

Figure 1:
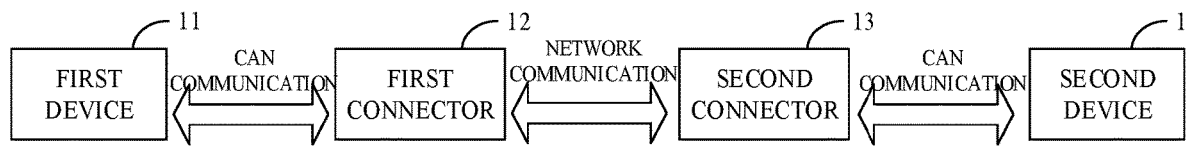
FIG. 1 is a schematic structural diagram of a data communication system according to embodiments of this disclosure.

In following description, for purpose of explanation rather than limitation, specific details such as specific system architecture and technology are set forth so as to provide a thorough understanding of embodiments of the present disclosure. However, it should be clear to those skilled in the art that the disclosure can be implemented in other embodiments without these specific details. In other cases, detailed descriptions of well-known systems, apparatus, circuits and methods are omitted so as not to obscure description of this disclosure with unnecessary details.

In order to illustrate technical solutions described in this disclosure, specific embodiments are given in the following.

It should be understood that when used in this specification and appended claims, a term "comprising" or "including" indicates existence of described features, integers, steps, operations, elements and/or components, but does not exclude existence or addition of one or more other features, integers, steps, operations, elements, components and/or combination thereof.

It should also be understood that terms used in the specification of this disclosure are only for the purpose of describing specific embodiments and are not intended to limit the disclosure. As used in this specification and appended claims, unless otherwise indicated clearly by the context, singular forms of "a", "an" and "the" are intended to encompass plural forms.

It should be further understood that a term "and/or" used in this disclosure specification and appended claims refers to any one or any combination of more of items listed in association and all of possible combinations, and includes these combinations.

As used in this specification and the appended claims, a term "if" can be interpreted as "when" or "once" or "in response to determination" or "in response to detection" depending on the context. Similarly, the phrases "if it is determined" or "if it is detected [described condition or event]" can be interpreted as meaning "once it is determined" or "in response to determination" or "once it is detected [described condition or event]" or "in response to detection of [described condition or event]" depending on the context.

In addition, in the description of this disclosure, terms "first", "second", "third", etc. are only used to distinguish descriptions, and cannot be understood as indicating or implying a relative importance.

Currently, when it is necessary to remotely transmit CAN bus data between two devices that are far away from each other, the two devices can be connected to a connector with network communication function respectively, and the remote transmission of the CAN bus data between the two devices can be realized indirectly through the connector. However, there exists a problem of low CAN bus data transmission efficiency and accuracy due to influence of the network speed in existing remote transmissions realized by means of the connector.

To solve the above technical problems, a data communication method and apparatus, an electronic device, and a storage medium are provided in embodiments of the present disclosure, in which CAN bus data transmitted by a first device is received; a first flow-control based transmission between the first connector and the first device is executed upon it is detected that the CAN bus data is first frame data in the multi-packet data, to obtain respective consecutive frame data in multi-packet data from the first device, where a CAN communication connection has been established between the first connector and the first device; the first frame data and the respective consecutive frame data are transmitted to a second connector when or after the first flow-control based transmission between the first connector and the first device is executed, to indicate that the second connector transmits the first frame data to a second device and transmits the respective consecutive frame data to the second device through a second flow-control based transmission, where network communication connection has been established between the first connector and the second connector and a CAN communication connection has been established between the second connector and the second device.

With data transmission being realized based on flow control, a process of data transmission can be controlled, and data loss can be prevented, and phenomenon of data loss caused by rate mismatch between communication parties when data is transmitted between two CAN interfaces can be avoided. In addition, since the first connector can directly execute the first flow-control based transmission between the first connector and the first device after receiving the CAN bus data of the first frame data, it is not necessary to wait for the CAN bus data to be transmitted to the second device before starting the first flow-control based transmission. After the first connector transmits the first frame data and the respective consecutive frame data to the second connector with which the first connector has established a remote network communication connection, the second connector also independently realizes the second flow-control based transmission between the second connector and the second device without relying on response of the first connector, so that when the first device and the second device indirectly and remotely transmit the multi-packet data, the transmission can be decoupled into the first flow-control based transmission and the second flow-control based transmission which are relatively independent and not affected by the network transmission speed, thus avoiding transmission failure of the multi-packet data due to influence of the network speed, improving success rate and efficiency of the multi-packet data transmission, and realizing the remote transmission of the CAN bus data between devices efficiently and accurately.

For ease of understanding, some related concepts of the embodiments of the present disclosure are firstly explained as follows:

(1) Flow Control

The flow control refers to a process of controlling data flow transmission. Data loss is prone to occur during data transmission. For example, when two computers transmit data through a serial port, it may occur that a data buffer at a receiving end is full but a transmitting end continues to transmitting data, due to different processing speeds of computers at both ends, thus resulting in data loss. The flow control can control transmitting speed and transmitting progressing of the data, thus solving a problem of data loss caused by unbalanced processing speed.

(2) Multi-packet Data: data that is transmitted in multiple data packets (i.e. multi-frame data).

(3) Single-packet data: data that only needs to be transmitted in one data packet (i.e. one frame of data).

(4) Connector

It is a communication device with both CAN communication function and network communication function CAN, which can be used as a transmission medium for remote CAN communication between devices. In some practical application scenarios, the connector can be an electronic device such as a handheld terminal with a CAN communication interface and a network communication module.

(5) CAN bus related protocols

In embodiments of this disclosure, the CAN bus mainly follows the ISO11898 protocol in a physical layer and a data link layer; and mainly follows the ISO15765 protocol in a network layer.

ISO15765 is a diagnostic protocol based on CAN network, and ISO15765-2 describes a network layer protocol. In this network layer protocol, two data transmission methods are provided: a single-packet data transmission method and a multi-packet data transmission method. Specifically, the network layer can determine which data transmission method is currently adopted according to a size of a maximum data packet that can be transmitted in a bottom layer sequentially and amount of data that needs to be transmitted currently.

Based on the ISO15765-2 protocol, a network protocol data unit (N_PDU) is of four types, namely, a Single Frame (SF) type, a First Frame (FF) type, a consecutive frame (CF) type and a Flow Control (FC) frame type, which are used to establish communication between peer entities. A data frame of the single frame SF format is adopted in a single-packet data transmission method; there are three formats of data frames in the multi-packet data transmission method: the first frame FF, the consecutive frame CF, and the flow control frame FC. With these three data frames, a multi-packet data transmission can be realized based on the flow control.

In the above multi-packet data transmission method, real-time requirement of data transmission is high, for example, a time interval between transmitting of the first frame and response of the flow control frame needs to be strictly controlled to be within 50 milliseconds.

For example, FIG. 1 is a schematic structural diagram of a data communication system according to embodiments of the present disclosure. The data communication system includes a first device 11, a first connector 12, a second connector 13, and a second device 14. A short-range CAN communication connection is established between the first device 11 and the first connector 12, with which CAN bus data can be directly transmitted. Similarly, a CAN communication connection can be established between the second device 14 and the second connector 13, with which the CAN bus data can be directly transmitted. A network communication connection is established between the first connector 12 and the second connector 13, with which a remote network transmission can be realized. Therefore, remote transmission of the CAN bus data can be indirectly realized between the first device 11 and the second device 14 by means of the first connector and the second connector.

When multi-packet data transmission is required between the first device 11 and the second device 14 in the data communication system illustrated in FIG. 1, the first device usually transmits first frame data of the multi-packet data to the first connector through a CAN bus, and the first connector transmits the first frame data to the second connector through a network, and then the second connector transmits the first frame data to the second device through the CAN bus. After receiving the first frame data, the second device returns flow-control frame data to the second connector. The second connector transmits the flow-control frame data to the first connector through the network, and the first connector transmits the flow-control frame data to the first device to instruct the first device to continue to transmitting consecutive frames in the multi-packet data. However, for the multi-packet data transmission with high real-time requirement, the transmission of multi-packet data is limited by a network transmission speed in this transmission mode. When the network transmission is unstable and is with a slow speed, if the first device fails to receive the response of the flow control frame in specified more than 50 milliseconds after transmitting the first frame data, data transmission failure occurs, which will ultimately affect success rate and efficiency of the multi-packet data transmission.

However, in a data communication method of the embodiment of the present disclosure, after receiving the first frame data transmitted by the first device, the first connector automatically returns a first flow control frame to the first device without waiting for response of the second device, so as to execute a first flow-control based transmission between the first connector and the first device, thereby successfully transmitting the multi-packet data from the first device to the first connector in real time. However, transmission and response of the flow control frame can be removed between the first connector and the second connector that realize data transmission through the network, so as to reduce real-time requirement for the network transmission. After the first connector successfully receives the multi-packet data, respective frame data of the multi-packet data is transmitted to the second connector sequentially. Similarly, the multi-packet data received by the second connector is successfully transmitted to the second device through a second flow-control based transmission without depending on the real-time network transmission. That is, with the data communication method of the embodiment of the present disclosure, when remote transmission of the multi-packet data is indirectly made between the first device and the second device as illustrated in FIG. 1, the transmission can be decoupled into the first flow-control based transmission and the second flow-control based transmission which are relatively independent and not affected by the network transmission speed, thus avoiding transmission failure of the multi-packet data due to influence of the network speed, improving the success rate and efficiency of the multi-packet data transmission, and realizing the remote transmission of the CAN bus data between devices efficiently and accurately.

Figure 2:
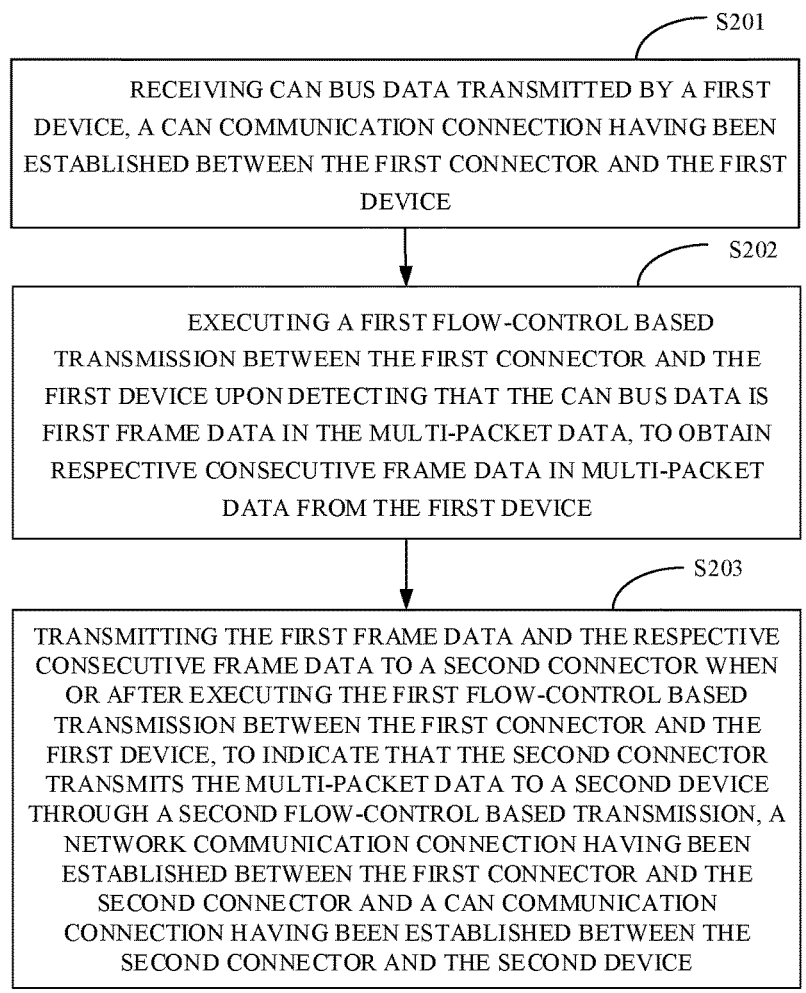
FIG. 2 is a flow diagram of a data communication method according to embodiments of the present disclosure.

FIG. 2 is a flow diagram of a data communication method according to embodiments of the present disclosure, which is applied to the first connector as illustrated in FIG. 1, and details are as follows.

At S201, controller area network (CAN) bus data transmitted by a first device is received, where a CAN communication connection has been established between the first connector and the first device.

In this embodiment, as illustrated in the data communication system of FIG. 1, a CAN communication connection has been established between the first device and the first connector. The first device can be a diagnostic instrument or a vehicle, and the first device can transmit the CAN bus data to the first connector based on the ISO15765 protocol when the vehicle is remotely diagnosed. The first connector receives the CAN bus data based on the ISO15765 protocol.

At S202, a first flow-control based transmission between the first connector and the first device is executed upon it is detected that the CAN bus data is first frame data in the multi-packet data, to obtain respective consecutive frame data in multi-packet data from the first device.

After receiving the CAN bus data, the first connector parses the CAN bus data to determine whether the CAN bus data is the first frame data FF in multi-packet data. In an embodiment, the CAN bus data is in a format of a network protocol data unit N_PDU, and the network protocol data unit N_PDU includes network address information (N_AI), network protocol control information (N_PCI) and Network data (N_Data). As four types of data frames, namely, a single frame SF, a first frame FF, a consecutive frame CF, and a flow control frame, are distinguished by the network protocol control information N_PCI, the network protocol control information N_PCI in the current N_PDU can be obtained by parsing the currently received CAN bus data, and whether the current CAN bus data is the first frame data can be determined according to this N_PCI. For example, when it is parsed that information of N_PCItype=1 is carried in the network protocol control information of the current CAN bus, it is determined that the first frame data is currently received.

When it is parsed and determined that the CAN bus data is the first frame data FF in multi-packet data, the first flow-control based transmission between the first connector and the first device is started to be performed. The first flow-control based transmission refers to a process that the first connector automatically generates the first flow-control frame data FC1 after receiving the first frame data FF and returns it to the first device in time, and then receives the consecutive frame data CF in the multi-packet data returned by the first device at a preset speed according to the first flow-control frame data FC1. With the first flow-control based transmission, the first connector can successfully obtain the respective consecutive frame data CF in multi-packet data from the first device at the preset speed.

In S203, when or after the first flow-control based transmission between the first connector and the first device is executed, the first frame data and the respective consecutive frame data are transmitted to a second connector to indicate that the second connector transmits the multi-packet data to a second device through a second flow-control based transmission, where a network communication connection has been established between the first connector and the second connector and a CAN communication connection has been established between the second connector and the second device.

In this embodiment, as illustrated in the data communication system of FIG. 1, a network communication connection has been established between the second connector and the first connector and a CAN communication connection has been established between the second connector and the second device.

In an embodiment, when the first connector performs the above-mentioned first flow-control based transmission between the first connector and the first device, that is, when the first connector receives a data frame, whether the data frame is the first frame data or the consecutive frame data, the data frame is immediately transmitted through the network, and the first frame data or the consecutive frame data is transmitted to the second connector. In another embodiment, after the first connector performs the above-mentioned first flow-control based transmission between the first connector and the first device, that is, after the first connector receives a complete multi-packet data, the first frame data and the consecutive frame data in the complete multi-packet data are sequentially transmitted to the second connector through the network transmission.

By transmitting the first frame data and the consecutive frame data in the multi-packet data to the second connector, the second connector can be indicated to transmit the first frame data to the second device, so as to start the second flow-control based transmission between the second connector and the second device to transmit respective consecutive frames in the multi-packet data to the second device at the preset speed to complete transmission of the multi-packet data. The second flow-control based transmission refers to a process that the second connector receives the second flow-control frame data FC2 returned by the second device, and transmits respective consecutive frame data CF to the second device at the preset speed according to the second flow-control frame data FC2.

In this embodiment, the network transmission (also called Internet communication) includes, but are not limited to, server-based network relaying transmission, point-to-point transmission, wired network transmission, and mobile communication network transmission such as 4G, 5G, 6G communication, etc. In an embodiment, the first frame data and the consecutive frame data are packaged by an Internet message protocol, and then transmitted to the second connector.

In this embodiment, with data transmission being realized based on flow control, a process of data transmission can be controlled, and data loss can be prevented, and phenomenon of data loss caused by rate mismatch between communication parties when data is transmitted between two CAN interfaces can be avoided. In addition, since the first connector can directly execute the first flow-control based transmission between the first connector and the first device after receiving the CAN bus data of the first frame data, it is not necessary to wait for the CAN bus data to be transmitted to the second device before starting the first flow-control based transmission. After the first connector transmits the first frame data and the respective consecutive frame data to the second connector with which the first connector has established a remote network communication connection, the second connector also independently realizes the second flow-control based transmission between the second connector and the second device without relying on response of the first connector, so that when the first device and the second device indirectly and remotely transmit the multi-packet data, the transmission can be decoupled into the first flow-control based transmission and the second flow-control based transmission which are relatively independent and not affected by the network transmission speed, thus avoiding transmission failure of the multi-packet data due to influence of the network speed, improving success rate and efficiency of the multi-packet data transmission, and realizing the remote transmission of the CAN bus data between devices efficiently and accurately.

Optionally, the first flow-control based transmission includes the following. Current first flow-control frame data is transmitted to the first device, the first flow-control frame data containing information of a first time interval. The consecutive frame data of the multi-packet data transmitted at the first time interval by the first device is received.

In this embodiment, upon detecting that the currently received CAN bus data is the first frame data in the multi-packet data, the first connector generates the current first flow-control frame data FC1 according to its preset configuration table, and transmits the first flow-control frame data FC1 to the first device. The first flow-control frame data FC1 specifically includes information of the first time interval.

In an embodiment, the flow-control frame data specifically includes following information in sequence:
(1) Data frame type information N_PCItype; when N_PCItype=3, it indicates that the current frame data is the flow-control frame data;
(2) Flow status (FS), which is configured to identify a state of a multi-packet data receiver. Here, when FS=0, it indicates that the receiver is ready for data transmission, and the transmitter can transmit a sequence frame; when FS=1, the transmitter continues to waiting for the flow control frame and resets a timeout timer; when FS=2, it indicates that the receiver's memory is not enough to receive data of the current multi-packet length, and the transmitter ends the data transmission;
(3) Block size (BS), which is configured to identify how many data frames can be continuously received currently;
(4) Separation time minimum (STmin), which is configured to indicate a time interval at which the transmitter transmits consecutive frames currently.

In this embodiment, the first flow-control frame data FC1 generated by the first connector may include the above four pieces of information (1) to (4), and a data block size in the first flow-control frame data is called the first data-block-size, and separation time minimum in the first flow-control frame data is called the first time interval.

In an embodiment, after receiving the first frame data FF, the first connector can parse the first frame data FF to obtain a first frame data length (FF_DL). FF_DL indicates total data amount of the multi-packet data to be transmitted this time. Then, a first data-block-size and a first time interval currently suitable for the multi-packet data transmission are determined according to FF_DL. Then, the first flow-control frame data is generated according to the first data-block-size, the first time interval, and other information in the preset configuration table. In some embodiments, the first flow-control frame data further carries information of CAN identification number (CANID) to identify which multi-packet data the current first flow-control frame data corresponds to.

After the first flow-control frame data is transmitted to the first device, the consecutive frame data CF of the multi-packet data sequentially transmitted at the first time interval by the first device according to instruction of the first flow-control frame data can be received.

In this embodiment, because the first connector can transmit the first flow-control frame data containing the information of the first time interval to the first device, the first device can transmit the consecutive frame data of multi-packet data at the first time interval, so that the first flow-control based transmission between the first connector and the first device can be efficiently and accurately realized without being affected by the network speed, and the flow control transmission of the multi-packet data can be efficiently and accurately realized.

Optionally, the first flow-control frame data further contains information of the first data-block-size, the first data-block-size indicates a number of frames of consecutive frame data that can be consecutively received currently; correspondingly, after receiving the consecutive frame data of the multi-packet data transmitted at the first time interval by the first device, the method further includes the following.

A number of frames of consecutive frame data received after transmitting the current first flow-control frame data is recorded. New flow-control frame data is re-determined as the current first flow-control frame data on condition that the number of frames reaches the first data-block-size, and return to execute a step of transmitting the current first flow-control frame data to the first device and subsequent steps.

In this embodiment, the first flow-control frame data includes the above-mentioned information of the first data-block-size BS. After transmitting the first flow-control frame data to the first device, the first connector records a number of frames of the currently received consecutive frame data after transmitting the current first flow-control frame data, each time it receives the consecutive frame data CF returned by the first device according to the first flow-control frame data. The first connector can further record a total number of frames of the consecutively received consecutive frame data after the first frame data is received.

Then, when it is detected that the number of frames has reached the first data-block-size, and the total number of frames has not yet reached total data amount of the multi-packet data, it indicates that receiving of the current multi-packet data has not been completed. At this time, according to its current memory resources and interface resources, the first connector re-determines the current flow state FS, the data-block-size BS, and the separation time minimum STmin, and combines the data frame type information "N_PCItype=3" to generate new flow-control frame data (i.e., a flow control frame containing the re-determined FS, BS, and STmin information) as the current first flow-control frame data. Thereafter, proceed to transmitting the current first flow-control frame data to the first device, so that the first device can continue to transmitting remaining consecutive frame data of the multi-packet data according to the new flow-control frame data.

In this embodiment, since the first connector can record the accumulative number of frames of the received consecutive frame data after transmitting the first flow-control frame data, and continue to transmitting new flow-control frame data according to the number of frames, flow control of multi-packet data transmission can be accurately realized, and the transmission of the multi-packet data can be successfully and efficiently realized.

Optionally, after the CAN bus data transmitted by the first device is received, the method further includes the following.

Single-packet data is transmitted to the second connector directly upon it is detected that the CAN bus data is the single-packet data, to indicate that the second connector transmits the single-packet data to the second device.

In this embodiment, after the CAN bus data transmitted by the first device is received, the CAN bus data is parsed, and if the current N_PCI type is determined to be 0 according to the network protocol control information N_PCI in the CAN bus data, it is determined that the current CAN bus data is a single frame data, that is, the current data to be received is single-packet data. At this time, the single-packet data (i.e. single frame data) is directly transmitted to the second connector through network transmission without any flow control, so as to indicate that the second connector transmits the single-packet data to the second device through a CAN bus after receiving the single-packet data.

In this embodiment, the first connector can serve as a medium for the first device to transmit the multi-packet data, and can also serve as a medium for the first device to transmit the single-packet data, thus flexibly and efficiently realizing data transmission between the first device and the second device.

Figure 3:
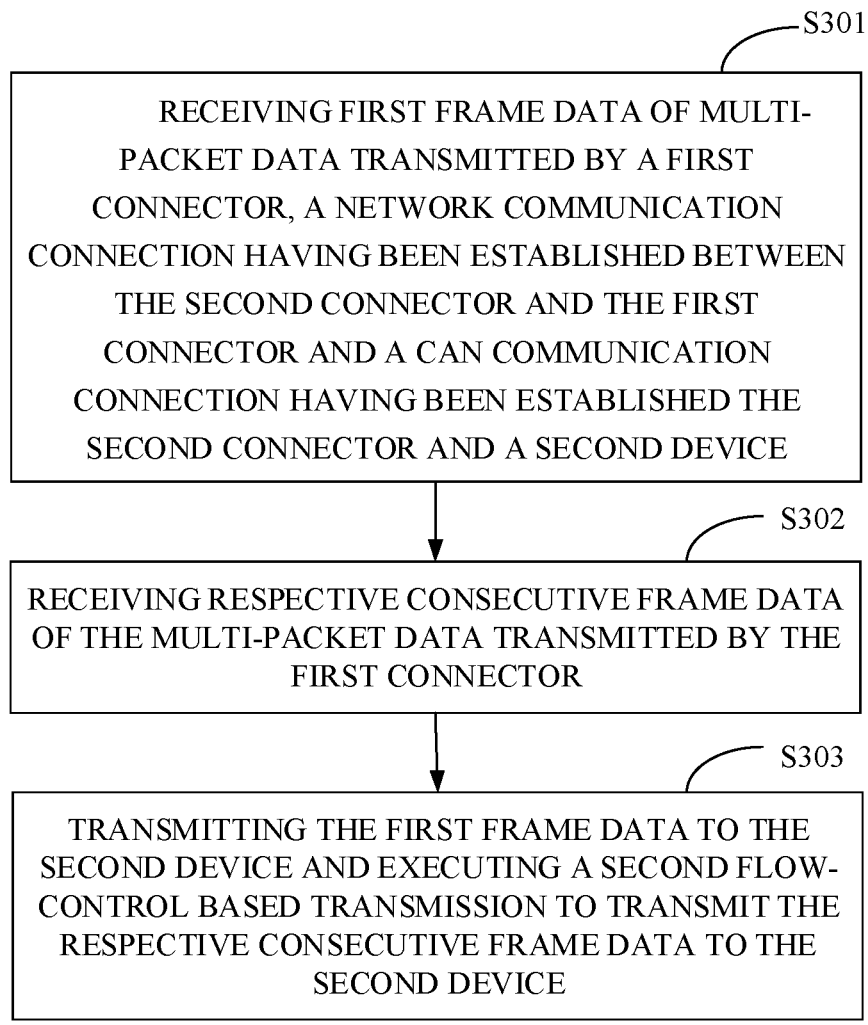
FIG. 3 is a flow diagram of another data communication method according to other embodiments of the present disclosure.

FIG. 3 shows a flow diagram of another data communication method according to other embodiments of the present disclosure, which is applied to the second connector as illustrated in FIG. 1, and details are as follows.

At S301, first frame data of multi-packet data transmitted by a first connector is received, where a network communication connection has been established between the second connector and the first connector and a CAN communication connection has been established the second connector and a second device.

In this embodiment, as illustrated in FIG. 1, a network communication connection has been established between the second connector and the first connector, with which data transmission can be performed through the Internet. In addition, a CAN communication connection also can be established between the second connector and the second device, so that data transmission can be performed between the second connector and the second device through a CAN bus.

The second connector can receive the first frame data of the multi-packet data transmitted by the first connector through the Internet. In an embodiment, after the second connector receives network data transmitted by the first connector through the network, if the data is parsed and determined to be the first frame data of the multi-packet data, a total number of frames of the multi-packet data can be determined according to the first frame data and the total number of frames can be recorded.

At S302, respective consecutive frame data of the multi-packet data transmitted by the first connector is received.

In this embodiment, after the first frame data of the multi-packet data is received, the respective consecutive frame data of the multi-packet data transmitted by the first connector through the network can be consecutively received.

In S303, the first frame data is transmitted to the second device and a second flow-control based transmission is executed to transmit the respective consecutive frame data to the second device.

In this embodiment, an order of steps of receiving the consecutive frame data and transmitting the first frame data to the second device can be arranged arbitrarily. In an embodiment, specifically, after the first frame data is received, the first frame data can be transmitted to the second device through the CAN bus (i.e., transmission of the first frame data is completed before receiving the respective consecutive frame data). In another embodiment, the first frame data can be transmitted to the second device after receiving the first frame data and the respective consecutive frame data, that is, after receiving complete multi-packet data.

After the first frame data is transmitted to the second device, the second flow-control based transmission is started to be performed, so that the respective consecutive frame data is sequentially transmitted to the second device at the preset speed through the flow control. In this embodiment, the second flow-control based transmission specifically refers to a process that the second connector receives second flow-control frame data returned by the second device according to the first frame data, and sequentially transmits the respective consecutive frame data to the second device according to the second flow-control frame data at a preset speed. In an embodiment, the second device transmits each consecutive frame to the second device at the preset speed after receiving it. In another embodiment, the second device buffers each consecutive frame after receiving it, and after all of the consecutive frames are received, they are transmitted to the second device one by one at the preset speed.

In this embodiment, with data transmission being realized based on flow control, a process of data transmission can be controlled, and data loss can be prevented, and phenomenon of data loss caused by rate mismatch between communication parties when data is transmitted between two CAN interfaces can be avoided. In addition, because the second flow-control based transmission is not affected by a network transmission speed, transmission failure of the multi-packet data due to influence of the network speed can be avoided, success rate and efficiency of the multi-packet data transmission can be improved, and the remote transmission of the CAN bus data between devices can be realized efficiently and accurately.

Optionally, after the respective consecutive frame data of the multi-packet data transmitted by the first connector is received, the method further includes the following.

The respective consecutive frame data is stored into a buffer. Correspondingly, the second flow-control based transmission can be executed to transmit the respective consecutive frame data to the second device can be made as follows.

The consecutive frame data is obtained from the buffer, according to second flow-control frame data returned according to the first frame data by the second device, upon the second flow-control frame data is received, and the consecutive frame data is transmitted to the second device.

In this embodiment, after the second connector receives the network data transmitted by the first connector through the network, the consecutive frame data is added to a queue of the buffer upon it is determined that the network data belongs to the consecutive frame data. In this way, the respective consecutive frame data can be stored in the buffer sequentially.

Then, after the first frame data of the multi-packet data is transmitted to the second device, if the second flow-control frame data returned by the second device according to the first frame data is received, the buffered consecutive frame data is obtained from the buffer, and the respective consecutive frame data is transmitted to the second device sequentially at a certain speed.

In this embodiment, since the consecutive frame data can be received and cached in the buffer to wait for the second flow-control frame data so as to be transmitted, a flow-control data transmission between the second connector and the second device can be stably realized, thus improving the success rate and accuracy of the multi-packet data transmission.

Optionally, the second flow-control frame data contains information of a second time interval and a second data-block-size, and correspondingly, the consecutive frame data can be obtained from the buffer according to the second flow-control frame data and transmitted to the second device can be made as follows.

Consecutive frame data of the second data-block-size is obtained from the buffer according to the second flow-control frame data, and the consecutive frame data of the second data-lock-size is sequentially transmitted to the second device at the second time interval.

In this embodiment, flow-control frame data returned by the second device is called the second flow-control frame data, separation time minimum (STmin) corresponding to the second flow-control frame data is called the second time interval, and a data-block-size (BS) corresponding to the second flow-control frame data is called the second data-block-size.

After the second connector receives the second flow-control frame data returned by the second device through the CAN bus, a target number of consecutive frame data with a same size as the second data-block-size is obtained from the buffer according to the information of the second data-block-size in the second flow-control frame data. Then, the target number of consecutive frame data are sequentially transmitted to the second device at the second time interval. After the second connector completes transmitting the consecutive frame data with the second data-block-size according to the current second flow-control frame data, if new second flow-control frame data is received, the second connector continues to obtaining remaining consecutive frame data from the buffer and transmitting it according to a new second data-block-size and a new second time interval in the new second flow-control frame data.

In this embodiment, a number and speed of the consecutive frame data transmitted in each round can be accurately controlled according to the second data-block-size and the second time interval contained in the second flow-control frame data, so the flow control transmission of the multi-packet data can be more accurately realized, and the success rate of the multi-packet data transmission can be improved.

Optionally, the data communication method further includes the following.

Single-packet data transmitted by the first connector is received and directly transmitted to the second device.

In this embodiment, when the second connector receives the single-packet data transmitted by the first connector through the network, it can transmit the single-packet data to the second device without any caching or flow control, so as to flexibly and efficiently realize single-packet data transmission between the first device and the second device.

Optionally, the data communication method further includes following content.

Network data received from the first connector is verified, and after verification is passed, frame data contained in the network data is allowed to be transmitted to the second device. The frame data includes any one of the first frame data, the consecutive frame data, and the single-packet data.

In this embodiment, whether the first connector transmits the first frame data, the consecutive frame data, or the single frame data in the single-packet data to the second connector, the data needs to be added with preset verification information and packaged as the network data. After receiving the network data, the second connector needs to parse and verify the network data. If the network data is detected to carry pre-agreed verification information, the network data is determined to be legal data. Then, the frame data in the network data is extracted, and a corresponding transmission operation is carried out according to a type of the frame data. For example, when the frame data is the first frame data or the single frame data, the frame data can be directly transmitted to the second device; and when the frame data is the consecutive frame data, the consecutive frame data can be stored in the buffer to wait for transmission. With verifying of the network data, security of data transmission can be improved.

Optionally, the first device is a vehicle, the first connector is a vehicle connector, the second device is a diagnostic instrument, and the second connector is a diagnostic instrument connector; or, the first device is a diagnostic instrument, the first connector is a diagnostic instrument connector, the second device is a vehicle, and the second connector is a vehicle connector.

The data communication methods described in Embodiment 1 and Embodiment 2 above can be applied to an application scenario of vehicle remote diagnosis. In this application scenario, when the first device as a data transmitter is a vehicle and the second device as a data receiver is a diagnostic instrument, the first connector may be a vehicle connector capable of CAN communication with the vehicle, and the second connector may be a diagnostic instrument connector capable of CAN communication with the diagnostic instrument. On the contrary, when the first device as the data transmitter is the diagnostic instrument and the second device as the data receiver is the vehicle, the first connector may be the diagnostic instrument connector and the second connector may be the vehicle connector.

In an embodiment, the CAN bus network in the embodiment of this disclosure includes various CAN bus networks such as high-speed CAN, fault-tolerant CAN, and single-wire CAN.

In an embodiment, the diagnostic instrument includes a handheld diagnostic instrument, a computer, and other tools that can scan the vehicle.

By applying the data communication methods of the embodiments of the present disclosure to a vehicle remote diagnosis application scenario including the vehicle and the diagnostic instrument, remote diagnosis of the vehicle can be efficiently and accurately realized.

Figure 4:
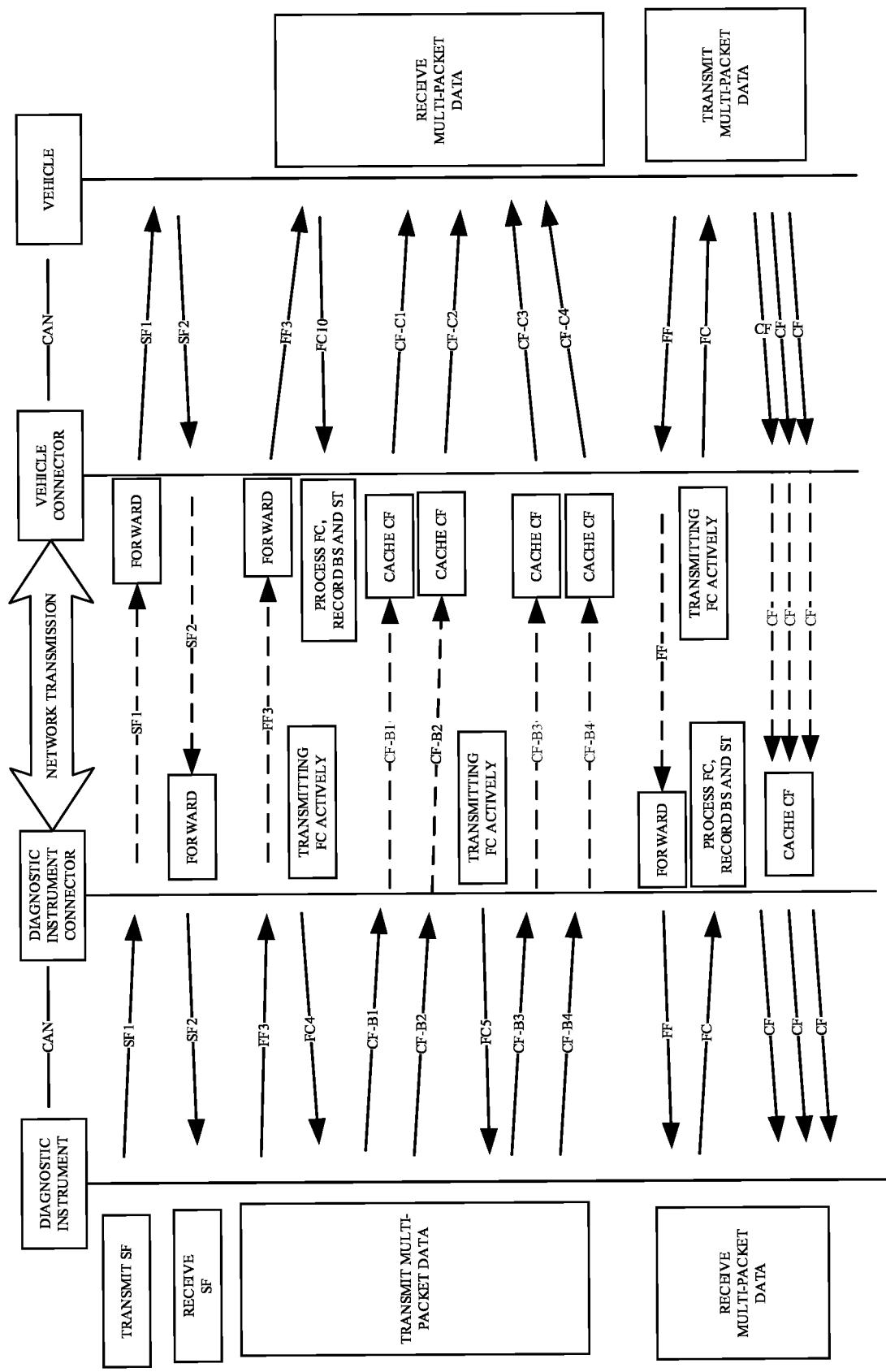
FIG. 4 is an interaction flow diagram of a data communication method according to embodiments of the present disclosure.

Illustratively, FIG. 4 is an interaction flow diagram of data flow in the vehicle remote diagnosis application scenario.

As for transmission of the single-packet data, as illustrated in FIG. 4, when the diagnostic instrument needs to transmit single frame data SF1, the single frame data SF1 can be transmitted to the diagnostic instrument connector through a CAN bus, and the diagnostic instrument connector transmits the single frame data SF1 to the vehicle connector through network transmission, and then the vehicle connector will forward the single frame data SF1 to the vehicle. Similarly, when the vehicle needs to transmit the single frame data SF2, the single frame data SF2 is transmitted to the vehicle connector through the CAN bus, and the vehicle connector transmits the single frame data SF2 to the diagnostic instrument connector through the network transmission, and then the diagnostic instrument connector forwards the single frame data SF2 to the diagnostic instrument.

For multi-packet data transmission, with the diagnostic instrument as the first device, the diagnostic instrument connector as the first connector, the vehicle as the second device, and the vehicle connector as the second connector, the multi-packet data transmission is as follows.

(1) The diagnostic instrument transmits first frame data FF3 of the multi-packet data to a diagnostic instrument connector through the CAN bus.

(2) The diagnostic instrument connector receives the first frame data FF3 and returns flow-control frame data FC4 to the diagnostic instrument through the CAN bus.

(3) The diagnostic instrument receives the flow-control frame data FC4, and sequentially transmits consecutive frame data CF-B1 and consecutive frame data CF-B2 to the diagnostic instrument connector according to the flow-control frame data FC4.

(4) After diagnostic instrument connector receives the consecutive frame data CF-B1 and the consecutive frame data CF-B2, and when detects that a number of currently received frames of 2 is equal to a data-block-size recorded in FF3, new flow-control frame data FC5 is generated and is transmitted to the diagnostic instrument to instruct the diagnostic instrument to continue transmitting remaining consecutive frame data CF-B3 and consecutive frame data CF-B4.

(5) The diagnostic instrument connector transmits the received first frame data FF3 to the vehicle connector through the network transmission so that the vehicle connector forwards the first frame data FF3 to the vehicle, when or after the diagnostic instrument connector receives respective consecutive frame data; and the diagnostic instrument connector transmits the received consecutive frame data to the vehicle connector through the network transmission, so that the vehicle connector caches the received consecutive frame data each time.

(6) After the vehicle connector transmits the first frame data FF3 to the vehicle, when the vehicle connector receives the flow-control frame data FC10 returned by the vehicle, the flow-control frame data is processed and a current data-block-size to be transmitted and time interval for transmitting respective frame data are recorded.

(7) Then, the vehicle connector obtains the cached consecutive frame data according to the data-block-size, and transmits the respective consecutive frame data to the vehicle at the time interval.

The multi-packet data transmission of transmitting multi-packet data from the vehicle to the diagnostic instrument is similar to the above, which will not be repeatedly described here.

In an embodiment, the data communication methods of the embodiments of the present disclosure can be applied to a remote technical guidance scenario of an air conditioner. In this scenario, the first device can be the air conditioner, the first connector can be an air conditioner connector that can communicate with the air conditioner, the second device can be an air conditioner servicing device, and the second connector can be a servicing device connector that can communicate with the air conditioner servicing device. Alternatively, the first device can be the air conditioner servicing device, the first connector is the servicing device connector, the second device is the air conditioner, and the second connector is the air conditioner connector. With the data communication methods of the embodiments of the disclosure, the air conditioner servicing device can indirectly communicate with the air conditioner remotely by means of the servicing device connector and the air conditioner connector, thereby realizing remote debugging and servicing of the air conditioner.

In another embodiment, the data communication methods of the embodiments of the present disclosure can be applied to a remote technical guidance scenario of industrial equipment in a production line. In this scenario, the first device can be the industrial equipment in the production line (such as a screw machine, a film application device, an injection molding machine, etc.), the first connector can be an industrial equipment connector capable of CAN communication with the industrial equipment, the second device can be a debugging device operated by a professional technician, and the second connector is a debugging device connector. Alternatively, the first device can be the debugging device, the first connector is the debugging device connector, the second device is the industrial equipment, and the second connector is the industrial equipment connector. With the data communication methods of the embodiment of the disclosure, professional technicians can use their own debugging device and indirectly communicate with the industrial equipment in the production line remotely by means of the debugging device connector and the industrial equipment connector without reaching the production line, thus realizing remote debugging and servicing of the industrial equipment.

It should be understood that a sequence number of respective steps in the above-described embodiments does not mean an execution order, and the execution order of respective processes should be determined in terms of their functions and internal logics, which poses no limitation on implementation of the embodiments of this disclosure.

Figure 5:
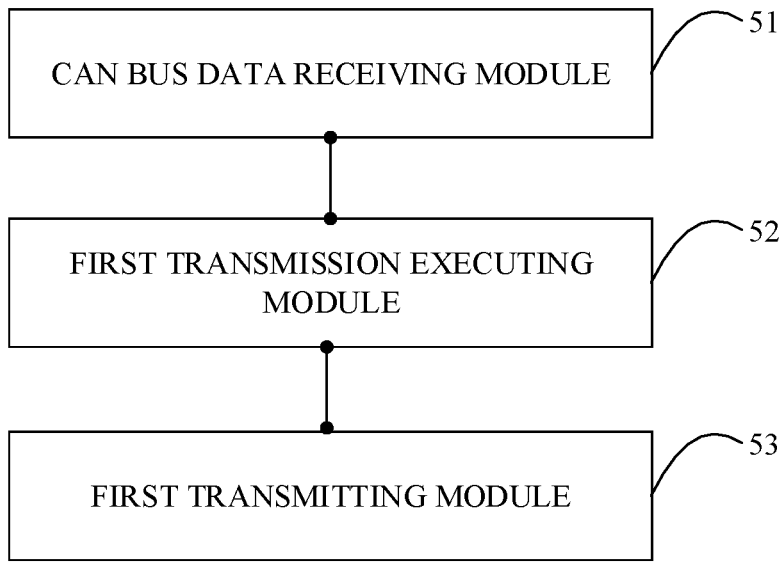
FIG. 5 is a schematic diagram of a data communication apparatus according to embodiments of the present disclosure.

FIG. 5 is a schematic diagram of a data communication apparatus according to embodiments of the present disclosure. The first data communication apparatus is applicable to a first connector. For ease of description, only parts related to embodiments of the present disclosure are illustrated.

The first data communication apparatus includes a controller area network (CAN) bus data receiving module 51, a first transmission executing module 52, and a first transmitting module 53.

The CAN bus data receiving module 51 is configured to receive CAN bus data transmitted by a first device, a CAN communication connection having been established between the first connector and the first device. The first transmission executing module 52 is configured to execute a first flow-control based transmission between the first connector and the first device upon detecting that the CAN bus data is first frame data in the multi-packet data, to obtain respective consecutive frame data in multi-packet data from the first device. The first transmitting module 53 is configured to transmit the first frame data and the respective consecutive frame data to a second connector when or after executing the first flow-control based transmission between the first connector and the first device, to indicate that the second connector transmits the multi-packet data to a second device through a second flow-control based transmission, a network communication connection having been established between the first connector and the second connector and a CAN communication connection having been established between the second connector and the second device.

Optionally, the first transmission executing module 52 includes a first flow-control frame data transmitting module and a first consecutive frame data receiving module.

The first flow-control frame data transmitting module is configured to transmit current first flow-control frame data to the first device, the first flow-control frame data containing information of a first time interval; and the first consecutive frame data receiving module is configured to receive the consecutive frame data of the multi-packet data transmitted at the first time interval by the first device.

Optionally, the first flow-control frame data further contains information of a first data-block-size, and the first data-block-size indicates a number of frames of consecutive frame data that can be consecutively received currently. The first data communication apparatus further includes a recoding module and a number comparing module.

The recoding module is configured to record a number of frames of consecutive frame data received after transmitting the current first flow-control frame data The number comparing module is configured to re-determine new flow-control frame data as the current first flow-control frame data on condition that the number of frames reaches the first data-block-size and return to execute a step of transmitting the current first flow-control frame data to the first device and subsequent steps.

Optionally, the data communication apparatus further includes a recoding module and a single-packet data transmitting module. The single-packet data transmitting module is configured to transmit single-packet data to the second connector directly to indicate that the second connector transmits the single-packet data to the second device, upon detecting that the CAN bus data is the single-packet data.

Figure 6:
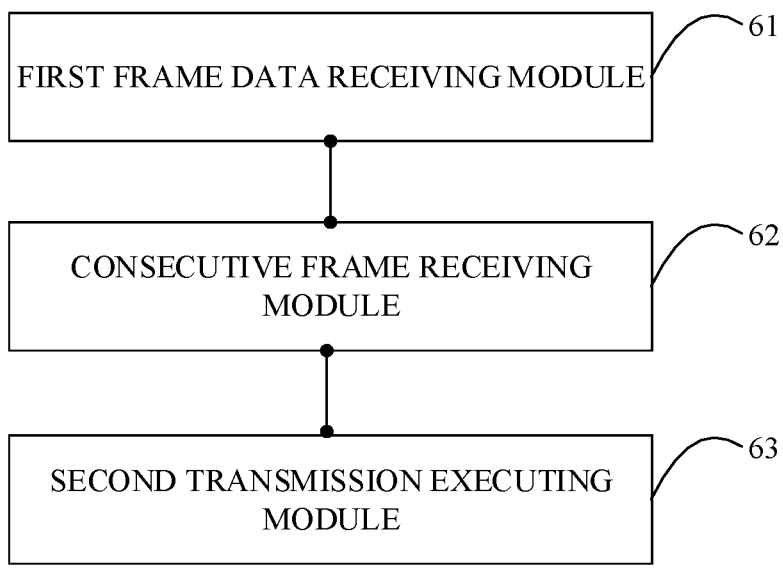
FIG. 6 is a schematic diagram of a data communication apparatus according to other embodiments of the present disclosure.

FIG. 6 is a schematic diagram of a second data communication apparatus according to other embodiments of the present disclosure. The second data communication apparatus is applicable to a second connector. For ease of description, only parts related to embodiments of the present disclosure are illustrated.

The second data communication apparatus includes a first frame data receiving module 61, a consecutive frame receiving module 62, and a second transmission executing module 63.

The first frame data receiving module 61 is configured to receive first frame data of multi-packet data transmitted by a first connector, a network communication connection having been established between the second connector and the first connector and a CAN communication connection having been established the second connector and a second device. The consecutive frame receiving module 62 is configured to receive respective consecutive frame data of the multi-packet data transmitted by the first connector. The second transmission executing module 63 is configured to transmit the first frame data to the second device and execute a second flow-control based transmission to transmit the respective consecutive frame data to the second device.

Optionally, the second data communication apparatus further includes a caching module. The caching module is configured to store the respective consecutive frame data into a buffer. The second transmission executing module 63 configured to execute the second flow-control based transmission to transmit the respective consecutive frame data to the second device is configured to obtain the consecutive frame data from the buffer, according to second flow-control frame data returned according to the first frame data by the second device, upon receiving the second flow-control frame data; and transmit the consecutive frame data to the second device.

Optionally, the second flow-control frame data contains information of a second time interval and a second data-block-size, and the second transmission executing module 63 configured to obtain the consecutive frame data from the buffer according to the second flow-control frame data and transmit the consecutive frame data to the second device is configured to obtain consecutive frame data of the second data-block-size from the buffer according to the second flow-control frame data, and sequentially transmit the consecutive frame data of the second data-lock-size to the second device at the second time interval.

It should be noted that information interaction, execution processes, etc., among the above apparatus/modules are based on a same concept as the method embodiments of the present disclosure. For specific functions and technical effects, reference can be made to the method embodiments, which will not be repeated here.

Figure 7:
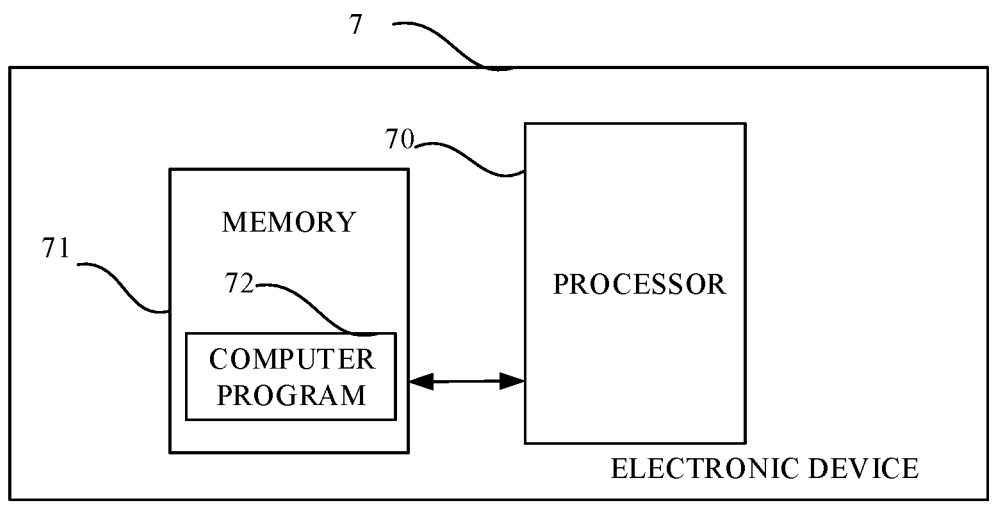
FIG. 7 is a schematic diagram of an electronic device according to embodiments of the present disclosure.

Reference can be made to FIG. 7, which is a schematic diagram of an electronic device according to embodiments of the present disclosure. An electronic device 7 of the embodiments includes a processor 70, a memory 71, and a computer program 72 stored in the memory 71 and operable on the processor 72 such as a data communication program.

The processor 70 executes the computer program 72 to implement operations in each of the data communication method embodiments described above, such as steps S201 to S203 illustrated in FIG. 2 or steps S301 to S303 illustrated in FIG. 3.

In an embodiment, the processor 70 causes the electronic device to implement the following operations when executing the computer program 72.

Controller area network (CAN) bus data transmitted by a first device is received, where a CAN communication connection has been established between the first connector and the first device. A first flow-control based transmission between the first connector and the first device is executed upon detecting that the CAN bus data is first frame data in the multi-packet data, to obtain respective consecutive frame data in multi-packet data from the first device. The first frame data and the respective consecutive frame data are transmitted to a second connector when or after the first flow-control based transmission between the first connector and the first device is executed, to indicate that the second connector transmits the multi-packet data to a second device through a second flow-control based transmission. A network communication connection has been established between the first connector and the second connector and a CAN communication connection has been established between the second connector and the second device.

Optionally, when the processor 70 executes the computer program 72, the first flow-control based transmission includes: transmitting current first flow-control frame data to the first device, the first flow-control frame data containing information of a first time interval; and receiving the consecutive frame data of the multi-packet data transmitted at the first time interval by the first device.

Optionally, the first flow-control frame data further contains information of a first data-block-size, and the first data-block-size indicates a number of frames of consecutive frame data that can be consecutively received currently. Correspondingly, the processor 70 is further configured to implement the following operations when executing the computer program 72. A number of frames of consecutive frame data received after transmitting the current first flow-control frame data is recorded. New flow-control frame data is re-determined as the current first flow-control frame data on condition that the number of frames reaches the first data-block-size and return to execute a step of transmitting the current first flow-control frame data to the first device and subsequent steps.

Optionally, the processor 70 is further configured to implement the following operations when executing the computer program 72. Single-packet data is transmitted to the second connector directly to indicate that the second connector transmits the single-packet data to the second device, upon detecting that the CAN bus data is the single-packet data.

In another embodiment, the processor 70 causes the electronic device to implement the following operations when executing the computer program 72.

First frame data of multi-packet data transmitted by a first connector is received. A network communication connection has been established between the second connector and the first connector and a CAN communication connection has been established between the second connector and a second device. Respective consecutive frame data of the multi-packet data transmitted by the first connector is received. The first frame data is transmitted to the second device and a second flow-control based transmission is executed to transmit the respective consecutive frame data to the second device.

Optionally, the processor 70 is further configured to implement the following operations when executing the computer program 72. The respective consecutive frame data is stored into a buffer; correspondingly, executing the second flow-control based transmission to transmit the respective consecutive frame data to the second device includes: obtaining the consecutive frame data from the buffer, according to second flow-control frame data returned according to the first frame data by the second device, upon receiving the second flow-control frame data; and transmitting the consecutive frame data to the second device.

Optionally, the second flow-control frame data contains information of a second time interval and a second data-block-size, and correspondingly, when the processor 70 executes the computer program 72, obtaining the consecutive frame data from the buffer according to the second flow-control frame data and transmitting the consecutive frame data to the second device includes: obtaining consecutive frame data of the second data-block-size from the buffer according to the second flow-control frame data, and sequentially transmitting the consecutive frame data of the second data-lock-size to the second device at the second time interval.

Or the processor 70 is configured to perform functions of each module/unit in each of the above apparatus embodiments when executing the computer program 72, for example, functions of the CAN bus data receiving module 51 to the first transmitting unit 53 as illustrated in FIG. 5, or functions of the first frame data receiving unit 61 to the second transmission flow executing unit 63 as illustrated in FIG. 6.

Exemplarily, the computer program 72 may be divided into one or more modules/units, which are stored in the memory 71 and executed by the processor 70 to complete the present disclosure. The one or more modules/units may be a series of computer-program-instruction segments capable of completing specific functions. The instruction segments are used to describe an execution process of the computer program 72 in the electronic device 7.

The electronic device 7 may be a computing device such as a connector, a desktop computer, a notebook, a palmtop, or the like. The electronic device 7 may include, but is not limited to, the processor 70 and the memory 71. Those skilled in the art may understand that, FIG. 5 is only an example of the electronic device 7 and does not limit the electronic device 7. The electronic device 7 may include more or less components than those illustrated in FIG. 5, or have certain components combined, or different components. For example, the electronic device may further include an input/output device, a network access device, a bus line, or the like.

The processor 70 may be a central processing unit (CPU), or other general-purpose processors (GPPs), a digital signal processor (DSP), an application specific integrated circuit (ASIC), a field-programmable gate array (FPGA), or other programmable logic components, a discrete gate or transistor logic component, a discrete hardware assembly, or the like. The GPPs may be microprocessors, any conventional processors, or the like.

The memory 71 may be an internal storage unit of the electronic device 7, such as a hard disk or memory of the electronic device 7. The memory 71 may also be an external storage device of the electronic device 7, such as a plug-in hard disk, a smart media card (SMC), a secure digital (SD) card, a flash card, or the like, equipped in the electronic device 7. Furthermore, the memory 71 may also include both the internal storage unit and the external storage device of the electronic device 7. The memory 71 may be configured to store the computer program and other programs and data required by the electronic device 7. The memory 71 may further be configured to temporarily store data which has been output or will be output.

As will be clearly understood by those skilled in the art, for convenience and conciseness of description, the division of the above functional units or modules is given only as an example, in practical application, the above functions can be allocated to and completed by different functional units or modules as needed, that is, the internal structure of the apparatus is divided into different functional units or modules to complete all or part of the functions described above. Each functional unit or module in the embodiments can be integrated in one processing unit, or each module can exist physically alone, and two or more modules can be integrated in one unit. The integrated unit can be realized in the form of hardware or software functional unit. In addition, the specific names of each functional unit or module are only for the convenience of distinguishing each other, and are not used to limit the protection scope of the present disclosure. Reference of the specific working process of the unit or module in the above system can be made to the corresponding process in the aforementioned method embodiment, and will not be repeated here.

In the above embodiments, the description of each embodiment has its own emphasis. For the parts not described or recorded in detail in a certain embodiment, reference may be made to the related description in other embodiments.

Those of ordinary skill in the art will appreciate that units and algorithmic operations of various examples described in connection with embodiments herein can be implemented by electronic hardware or by a combination of computer software and electronic hardware. Whether these functions are performed by means of hardware or software depends on specific applications and design constraints of technical solutions. Those skilled in the art may use different methods to implement the described functions for each specific application, but such implementation should not be regarded as lying beyond the scope of the present disclosure.

In the embodiments of the present disclosure, it should be understood that, the apparatus/electronic device/method disclosed in embodiments provided herein may be implemented in other manners. For example, the apparatus/electronic device embodiments described above are merely illustrative; for instance, the division of the module or unit is only a logical function division and there can be other manners of division during actual implementations, for example, multiple modules (units) or assemblies may be combined or may be integrated into another system, or some features may be ignored, omitted, or not performed. In addition, coupling or communication connection between each illustrated or discussed component may be direct coupling or communication connection, or may be indirect coupling or communication among devices or modules via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated module/unit may be stored in a computer readable medium when it is implemented in the form of a software functional unit and is sold or used as a separate product. Based on such understanding, all or part of flow in the method embodiments of the present disclosure can also be completed by instructing relevant hardware through a computer program. The computer program can be stored in a computer readable storage medium. When the computer program is executed by a processor, the steps of the above method embodiments can be realized. The computer program includes computer program code, which may be in source code form, object code form, executable file, or some intermediate form, etc. The computer readable medium may include any entity or device capable of carrying the computer program code, a recording medium, a U disk, a removable hard disk, a magnetic disk, an optical disk, a computer memory, a read-only memory (ROM), a random access memory (RAM), an electrical carrier signal, a telecommunications signal, a software distribution medium, and the like. It should be noted that the content of the computer-readable medium may be appropriately increased or decreased according to the requirements of legislation and patent practice in the jurisdiction. For example, in some jurisdictions, according to legislation and patent practice, the computer-readable medium does not include electrical carrier signals and telecommunication signals.

The above illustrations are only used to illustrate technical solutions of the present disclosure, but not intended to limit the present disclosure. Although the present disclosure has been described in detail with reference to the above embodiments, those of ordinary skills in the art should understand that they can still modify the technical solutions recorded in each above embodiment, or perform equivalent substitutions on some of the technical features therein; and such modifications or substitutions do not make the essence of the corresponding technical solution depart from the spirit and scope of the technical solution of each embodiment of the present disclosure, and shall fall within the protection scope of the present disclosure.

What is claimed is:

1. A data communication method, for remote transmission of controller area network (CAN) bus data and applicable to a first connector, the method comprising:
receiving CAN bus data transmitted by a first device, a CAN communication connection having been established between the first connector and the first device;
executing a first flow-control based transmission between the first connector and the first device upon detecting that the CAN bus data is first frame data in the multi-packet data, to obtain respective consecutive frame data in multi-packet data from the first device; and
transmitting the first frame data and the respective consecutive frame data to a second connector through network transmission when or after executing the first flow-control based transmission between the first connector and the first device, to indicate that the second connector transmits the multi-packet data to a second device through a second flow-control based transmission, a network communication connection having been established between the first connector and the second connector and a CAN communication connection having been established between the second connector and the second device, the network transmission comprising at least one of server-based network relaying transmission, point-to-point transmission, wired network transmission, or mobile communication network transmission;
wherein the first flow-control based transmission comprises: the first connector transmits first current flow-control frame data to the first device after receiving the first frame data in the multi-packet data, and receives the consecutive frame data of the multi-packet data transmitted at a time interval by the first device, the flow-control frame data containing information of the time interval; and
wherein the second flow-control based transmission comprises: the second device transmits second current flow-control frame data to the second connector according to first frame data in the multi-packet data from the second connector, and receives consecutive frame data of the multi-packet data transmitted by the second connector.

2. The data communication method according to claim 1, wherein the flow-control frame data further contains information of a data-block-size, the data-block-size indicates a number of frames of consecutive frame data that can be consecutively received currently; and correspondingly, after receiving the consecutive frame data of the multi-packet data transmitted at the time interval by the first device, the method further comprises:
recording a number of frames of consecutive frame data received after transmitting the first current flow-control frame data; and
re-determining, according to memory resources and interface resources of the first connector, new flow-control frame data as the first current flow-control frame data on condition that the number of frames reaches the data-block-size and returning to execute a step of transmitting the first current flow-control frame data to the first device and subsequent steps.

3. The data communication method according to claim 1, after receiving the CAN bus data transmitted by the first device, further comprising:
transmitting single-packet data to the second connector directly to indicate that the second connector transmits the single-packet data to the second device, upon detecting that the CAN bus data is the single-packet data.

4. The data communication method according to claim 1, wherein the first device is a vehicle, the first connector is a vehicle connector, the second device is a diagnostic instrument, and the second connector is a diagnostic instrument connector; or, the first device is a diagnostic instrument, the first connector is a diagnostic instrument connector, the second device is a vehicle, and the second connector is a vehicle connector.

5. The data communication method according to claim 1, wherein the first device is an air conditioner, the first connector is an air conditioner connector, the second device is an air conditioner servicing device, and the second connector is a servicing device connector; or, the first device is an air conditioner servicing device, the first connector is a servicing device connector, the second device is an air conditioner, and the second connector is an air conditioner connector.

6. The data communication method according to claim 1, wherein the first device is an industrial equipment in the production line, the first connector is an industrial equipment connector, the second device is a debugging device operated by a professional technician, and the second connector is a debugging device connector; or, the first device is a debugging device operated by a professional technician, the first connector is a debugging device connector, the second device is an industrial equipment in the production line, and the second connector is an industrial equipment connector.

7. A data communication method, applicable to a second connector and comprising:
receiving, through network transmission, first frame data of multi-packet data transmitted by a first connector, a network communication connection having been established between the second connector and the first connector and a controller area network (CAN) communication connection having been established the second connector and a second device, the network transmission comprising at least one of server-based network relaying transmission, point-to-point transmission, wired network transmission, or mobile communication network transmission, wherein the multi-packet data is transmitted from a first device to the first connector through a first flow-control based transmission;
receiving respective consecutive frame data of the multi-packet data transmitted by the first connector; and
transmitting the first frame data to the second device and executing a second flow-control based transmission to transmit the respective consecutive frame data to the second device;
wherein the first flow-control based transmission comprises: the first connector transmits first current flow-control frame data to the first device and receives consecutive frame data of the multi-packet data transmitted at a time interval by the first device, the flow-control frame data containing information of the time interval; and
the second flow-control based transmission comprises: the second connector receives second flow-control frame data returned according to the first frame data by the second device; and transmits the consecutive frame data to the second device to the second device.

8. The data communication method according to claim 7, after receiving the respective consecutive frame data of the multi-packet data transmitted by the first connector, further comprising:
storing the respective consecutive frame data into a buffer.

9. The data communication method according to claim 8, wherein the second flow-control frame data contains information of a time interval and a data-block-size, and correspondingly, obtaining the consecutive frame data from the buffer according to the second flow-control frame data and transmitting the consecutive frame data to the second device comprises:
obtaining consecutive frame data of the data-block-size from the buffer according to the second flow-control frame data, and sequentially transmitting the consecutive frame data of the data-lock-size to the second device at the time interval.

10. The data communication method according to claim 7, wherein the first device is a vehicle, the first connector is a vehicle connector, the second device is a diagnostic instrument, and the second connector is a diagnostic instrument connector; or, the first device is a diagnostic instrument, the first connector is a diagnostic instrument connector, the second device is a vehicle, and the second connector is a vehicle connector.

11. The data communication method according to claim 7, wherein the first device is an air conditioner, the first connector is an air conditioner connector, the second device is an air conditioner servicing device, and the second connector is a servicing device connector; or, the first device is an air conditioner servicing device, the first connector is a servicing device connector, the second device is an air conditioner, and the second connector is an air conditioner connector.

12. The data communication method according to claim 7, wherein the first device is an industrial equipment in the production line, the first connector is an industrial equipment connector, the second device is a debugging device operated by a professional technician, and the second connector is a debugging device connector; or, the first device is a debugging device operated by a professional technician, the first connector is a debugging device connector, the second device is an industrial equipment in the production line, and the second connector is an industrial equipment connector.

13. The data communication method according to claim 7, further comprising:
receiving single-packet data transmitted by the first connector and directly transmitting the single-packet data to the second device.

14. The data communication method according to claim 13, further comprising:
verifying network data received from the first connector;
transmitting frame data contained in the network data to the second device on condition that verification is passed, wherein the frame data comprises any one of: the first frame data, the consecutive frame data, and the single-packet data.

15. An electronic device comprising a memory, a processor, and a computer program stored in the memory and executable on the processor, wherein the computer program, when executed by the processor, causes the electronic device to:

receive controller area network (CAN) bus data transmitted by a first device, a CAN communication connection having been established between the electronic device and the first device;
execute a first flow-control based transmission between the electronic device and the first device upon detecting that the CAN bus data is first frame data in the multi-packet data, to obtain respective consecutive frame data in multi-packet data from the first device; and
transmit the first frame data and the respective consecutive frame data to a second connector through network transmission when or after executing the first flow-control based transmission between the electronic device and the first device, to indicate that the second connector transmits the multi-packet data to a second device through a second flow-control based transmission, a network communication connection having been established between the electronic device and the second connector and a CAN communication connection having been established between the second connector and the second device, the network transmission comprising at least one of server-based network relaying transmission, point-to-point transmission, wired network transmission, or mobile communication network transmission;
wherein the first flow-control based transmission comprises: the first connector transmits first current flow-control frame data to the first device after receiving the first frame data in the multi-packet data, and receives the consecutive frame data of the multi-packet data transmitted at a time interval by the first device, the flow-control frame data containing information of the time interval; and
wherein the second flow-control based transmission comprises: the second device transmits second current flow-control frame data to the second connector according to first frame data from the second connector, and receives the consecutive frame data of the multi-packet data transmitted by the second connector.

16. The electronic device according to claim 15, wherein the flow-control frame data further contains information of a first data-block-size, the first data-block-size indicates a number of frames of consecutive frame data that can be consecutively received currently; and the computer program, when executed by the processor, further causes the electronic device to:
record a number of frames of consecutive frame data received after transmitting the first current flow-control frame data after receiving the consecutive frame data of the multi-packet data transmitted at the first time interval by the first device; and
re-determine, according to memory resources and interface resources of the electronic device, new flow-control frame data as the first current flow-control frame data on condition that the number of frames reaches the first data-block-size and return to execute a step of transmitting the first current flow-control frame data to the first device and subsequent steps.

17. The electronic device according to claim 15, wherein the computer program, when executed by the processor, further causes the electronic device to:
after receiving the CAN bus data transmitted by the first device,
transmit single-packet data to the second connector directly to indicate that the second connector transmits the single-packet data to the second device, upon detecting that the CAN bus data is the single-packet data.

18. The electronic device according to claim 15, wherein the computer program, when executed by the processor, further causes the electronic device to:
  verify network data received from the electronic device;
  transmit frame data contained in the network data to the second device on condition that verification is passed, wherein the frame data comprises any one of: the first frame data, the consecutive frame data, and the single-packet data.

* * * * *